US008409471B2

(12) United States Patent
Song et al.

(10) Patent No.: US 8,409,471 B2
(45) Date of Patent: Apr. 2, 2013

(54) GREEN PHOSPHOR AND DISPLAY DEVICE INCLUDING THE SAME

(75) Inventors: Yu-Mi Song, Yongin-si (KR); Jay-Hyok Song, Yongin-si (KR); Ick-Kyu Choi, Yongin-si (KR); Young-Hun Lee, Yongin-si (KR); Young-Ki Kim, Yongin-si (KR); Mi-Ran Song, Yongin-si (KR); Do-Hyung Park, Yongin-si (KR); Yoon-Chang Kim, Yongin-si (KR); Young-Kwan Kim, Yongin-si (KR); Soon-Rewl Lee, Yongin-si (KR); Dong-Sik Zang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 176 days.

(21) Appl. No.: 12/855,610

(22) Filed: Aug. 12, 2010

(65) Prior Publication Data
US 2011/0127466 A1 Jun. 2, 2011

(30) Foreign Application Priority Data

Dec. 2, 2009 (KR) .................. 10-2009-0118747

(51) Int. Cl.
*C09K 11/08* (2006.01)
*H01J 29/10* (2006.01)
(52) U.S. Cl. ................. 252/301.4 R; 313/467
(58) Field of Classification Search ........... 252/301.4 R; 313/467, 468, 483, 486, 503
See application file for complete search history.

(56) References Cited

U.S. PATENT DOCUMENTS

| | | | | |
|---|---|---|---|---|
| 4,219,587 A * | 8/1980 | Oba et al. | ......................... | 427/64 |
| 4,309,481 A * | 1/1982 | Wakatsuki et al. | ........... | 428/403 |
| 2004/0080256 A1 * | 4/2004 | Hampden-Smith et al. | .. | 313/467 |
| 2005/0096420 A1 * | 5/2005 | Delp et al. | ..................... | 524/430 |
| 2006/0152135 A1 | 7/2006 | Choi et al. | | |
| 2009/0195142 A1 * | 8/2009 | Song et al. | ..................... | 313/483 |

FOREIGN PATENT DOCUMENTS

| | | |
|---|---|---|
| CN | 1821342 A | 8/2006 |
| KR | 10-2005-0110938 A | 11/2005 |
| KR | 10-2006-0088403 A | 8/2006 |
| KR | 10-2007-0078218 A | 7/2007 |
| KR | 10-2009-0021733 A | 3/2009 |
| KR | 10-2009-0084468 | 8/2009 |

OTHER PUBLICATIONS

KIPO Office action dated Jul. 20, 2011, for Korean priority Patent application 10-2009-0118747, noting listed reference in this IDS, as well as KR 10-2007-0078218, previously submitted in an IDS dated Aug. 12, 2010, 5 pages.
SIPO Office action dated Dec. 17, 2012, for corresponding Chinese Patent application 201010266995.8, (5 pages).

* cited by examiner

*Primary Examiner* — Emily Le
*Assistant Examiner* — Lynne Edmondson
(74) *Attorney, Agent, or Firm* — Christie, Parker & Hale, LLP

(57) ABSTRACT

A green phosphor including a compound represented by Formula 1 $(Y_{3-x}M_x)(Al_{5-y}M'_y)O_{12}:Ce_z$ and a pigment. The green phosphor having the compound represented by Formula 1 and a pigment has a shorter decay time than conventional phosphors, and thereby confers excellent luminescence characteristics and color purity. A display panel including the green phosphor 1 is also provided herein.

10 Claims, 3 Drawing Sheets

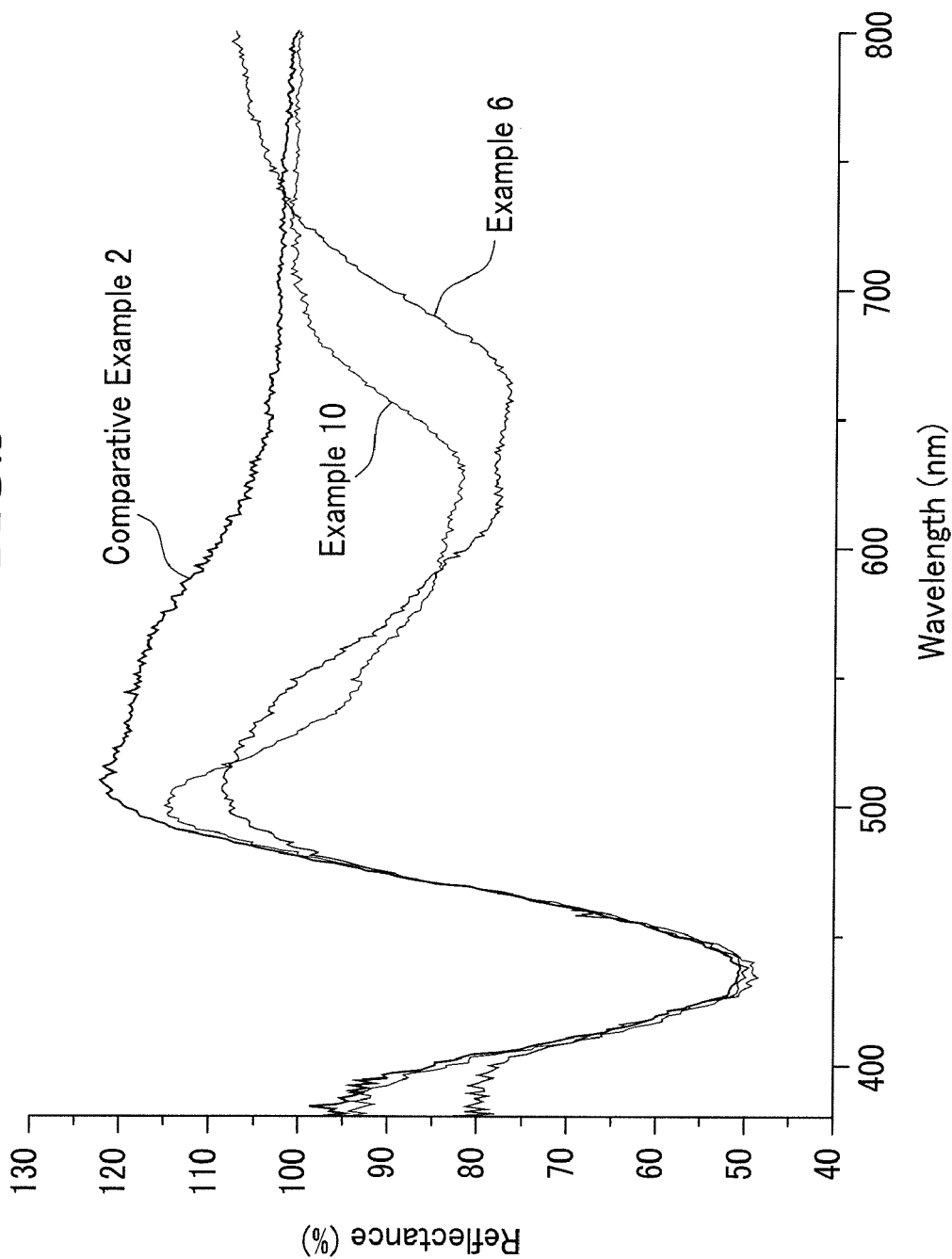

GREEN PHOSPHOR AND DISPLAY DEVICE INCLUDING THE SAME

CROSS-REFERENCE TO RELATED APPLICATIONS

This application claims priority to and the benefit of Korean Patent Application No. 10-2009-0118747 filed in the Korean Intellectual Property Office on Dec. 2, 2009, the entire content of which is incorporated herein by reference.

BACKGROUND

1. Field

This disclosure relates to a green phosphor and a display device including the same.

2. Description of the Related Art

The conventional green phosphor used for a plasma display panel (PDP) generally includes $Zn_2SiO_4$:Mn, $YBO_3$:Tb, (Ba,Sr)$MgAl_{14}O_{23}$:Mn, and the like. However, these elements are limited and do not efficiently realize stereoscopic images due to their inherently long decay time.

Recent studies have shown that green phosphor having a short decay time, has excellent display properties and can be applied to display three-dimensional stereoscopic images for the next-generation of virtual three-dimensional stereoscopic multimedia, in applications including: telecommunication, broadcast, medical, education, training, military, game, animation, virtual reality, CAD, industrial technology, and the like.

SUMMARY

An aspect of an embodiment of the present invention is directed toward a green phosphor having a relatively short decay time, thereby providing excellent luminescence characteristics and color purity.

An aspect of an embodiment of the present invention is directed toward a plasma display panel including a green phosphor as described herein.

In one embodiment, a green phosphor is provided including a compound represented by Formula 1 and a pigment:

$(Y_{3-x}M_x)(Al_{5-y}M'_y)O_{12}:Ce_z;$  Formula 1

Wherein:

M is selected from the group consisting of Sc, Gd, In, Lu, and La;

M' is selected from the group consisting of Sc, Ga, Gd, In, Lu, and La;

$0 \leq x < 3$, $0 \leq y < 5$, and $0 < z \leq 0.5$.

In one embodiment, the compound is represented by a formula selected from the group consisting of Formula 2, Formula 3, and combinations thereof;

$Y_3Al_5O_{12}:Ce_z;$  Formula 2

$Y_3(Al_{1-k}Ga_k)_5O_{12}:Ce_z;$  Formula 3

Wherein:

$0 \leq k < 1$, and $0 < z \leq 0.5$.

In one embodiment, the pigment is on a surface of the phosphor compound.

In one embodiment, the pigment is mixed with the compound.

In one embodiment, the pigment includes an oxide selected from chromium oxide, cobalt oxide, copper oxide, aluminum oxide, and combinations thereof.

In one embodiment, the pigment includes an oxide selected from the group consisting of $Cr_2O_3$, $CoAl_2O_4$, $Cr_2O(OH)_4$, CuO, and combinations thereof.

In one embodiment, the pigment includes a combination of $Cr_2O_3$ and $CoAl_2O_4$.

In one embodiment, the pigment includes $Cr_2O_3$ and $CoAl_2O_4$ in a weight ratio of from about 2:8 to about 8:2.

In one embodiment, the pigment is provided in an amount of from about 0.01 parts by weight to about 20 parts by weight based on 100 parts by weight of the compound.

In one embodiment of the present invention, the pigment is provided in an amount of from about 0.1 parts by weight to about 2 parts by weight based on 100 parts by weight of the compound.

In one embodiment, the pigment is in the form of particles, and the pigment particles have an average particle diameter of from about 5 nm to about 1.5 μm.

In one embodiment, the pigment particles have an average particle diameter of from about 10 nm to about 1 μm.

In one embodiment, a display device is provided to include a green phosphor, the green phosphor including a compound represented by Formula 1 and a pigment.

In one embodiment, the display device includes at least one selected from a plasma display panel (PDP), a cathode ray tube, and a lamp.

Further embodiments will be described in more detail, hereafter.

A green phosphor of embodiments of the present invention has a short decay time, conferring excellent luminescence characteristics and color purity.

BRIEF DESCRIPTION OF THE DRAWINGS

FIG. 3 shows reflectance spectra of phosphors prepared according to Examples 6 and 10 and Comparative Example 2.

DETAILED DESCRIPTION

Figure 1:
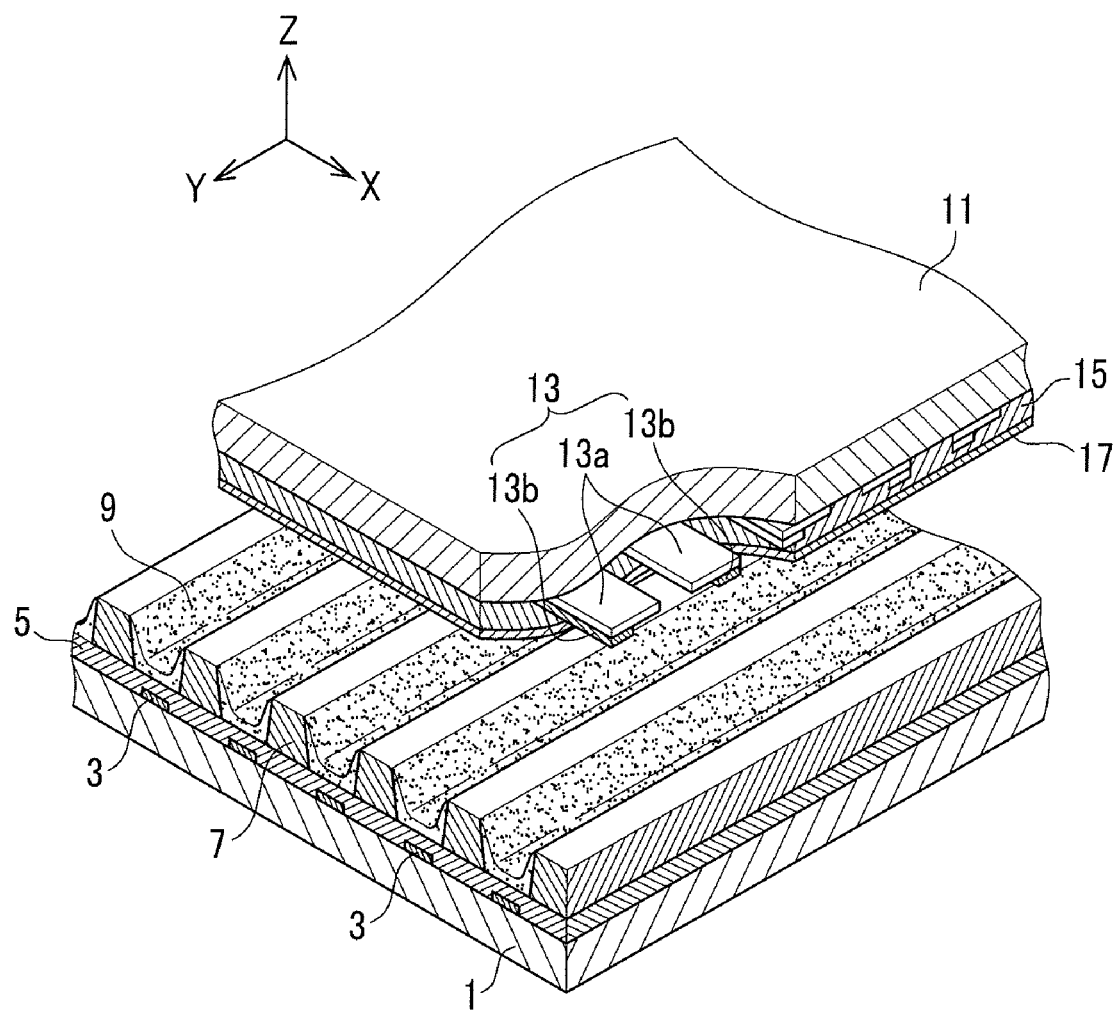
FIG. 1 is a schematic view of a plasma display panel according to one embodiment of the present invention.

Exemplary embodiments will hereinafter be described in detail. However, these embodiments are exemplary, and this disclosure is not limited thereto.

A green phosphor according to one embodiment includes a phosphor compound represented by Formula 1 and a pigment.

$(Y_{3-x}M_x)(Al_{5-y}M'_y)O_{12}:Ce_z$  Formula 1

In the above Formula 1,

M is Sc, Gd, In, Lu, or La;

M' is Sc, Ga, Gd, In, Lu, or La, $0 \leq x < 3$, $0 \leq y < 5$, and $0 < z \leq 0.5$.

In one embodiment, the phosphor includes a compound represented by Formula 2, a compound represented by Chemical Formula 3, or a combination thereof.

$Y_3Al_5O_{12}:Ce_z$  Formula 2

$Y_3(Al_{1-k}Ga_k)_5O_{12}:Ce_z$  Formula 3

In Formulae 2 and 3, $0 \leq k < 1$, and $0 < z \leq 0.5$.

According to one embodiment, a compound represented by Formula 3 is $Y_3(Al_{0.5}Ga_{0.5})_5O_{12}:Ce_z$, wherein $0 < z \leq 0.5$.

A phosphor including the compound represented by Formula 1 has a short decay time of about 1 ms or less than about 1 ms, which is shorter than the decay time of conventional phosphor compounds, such as (Ba,Sr)$MgAl_{14}O_{23}$:Mn. With a shorter decay time, a stereoscopic image is more easily realized (produced). With a pigment included therein, the reflection luminescence characteristics are improved. That is, a green phosphor having a short decay time compound and a pigment provides for improved external light reflection luminescence characteristics and improved color purity.

In one embodiment of the present invention, a pigment is provided on a surface of the phosphor compound. In this embodiment, the pigment is applied onto a surface of the phosphor compound, or it is mixed with the phosphor compound, but this disclosure is not limited thereto. In another embodiment, a pigment is applied onto the entire surface, or a portion of the surface of the phosphor compound. The pigment may coat a portion of a surface of the phosphor compound, such that the pigment forms an island on the phosphor compound.

In one embodiment, the pigment includes chromium oxide, cobalt oxide, copper oxide, aluminum oxide or combinations thereof. According to one embodiment, the pigment includes an oxide such as $Cr_2O_3$, $CoAl_2O_4$, $Cr_2O(OH)_4$, CuO or a combination thereof. According to another embodiment, the pigment includes a combination of $Cr_2O_3$ and $CoAl_2O_4$. Because these pigments selectively absorb light of a particular wavelength according to their kind (type), it is possible to control CIE color coordinates into desired color coordinates by properly selecting the pigments and including them in a green phosphor. In this way, the green phosphor reduces luminance loss and improves color coordinates to achieve excellent color purity.

When the pigment includes a combination of $Cr_2O_3$ and $CoAl_2O_4$, the $Cr_2O_3$ and $CoAl_2O_4$ may be included in a weight ratio of from about 2:8 to about 8:2. According to one embodiment, $Cr_2O_3$ and $CoAl_2O_4$ are provided in a weight ratio of from about 4:6 to about 6:4. According to another embodiment, $Cr_2O_3$ and $CoAl_2O_4$ are provided in a weight ratio of about 5:5. When $Cr_2O_3$ and $CoAl_2O_4$ are provided within one of the above ratios, coloring efficiency is high and luminescence characteristics are improved efficiently.

In one embodiment, the pigment is provided in an amount of from about 0.01 parts by weight to about 20 parts by weight based on 100 parts by weight of the phosphor compound. According to one embodiment, the pigment is included in an amount of from about 0.05 parts by weight to about 10 parts by weight based on 100 parts by weight of the phosphor compound. According to another embodiment, the pigment is provided in an amount of from about 0.1 parts by weight to about 2 parts by weight based on 100 parts by weight of the phosphor compound. When the pigment is provided within the above content range, the yellow body color of the phosphor compound readily becomes green in color, and color coordinates are moved as well. By efficiently decreasing reflectance luminance more than relative luminance, it is possible to achieve excellent luminescence characteristics.

The pigment may exist in the form of particles. In one embodiment, the pigment particles have an average particle diameter of from about 5 nm to about 1.5 p m. According to one embodiment, the pigment particles have an average particle diameter of from about 10 nm to about 1 µm. When the average particle diameter of the pigment is within the above range, the pigment is easily dispersed and efficiently mixed with the phosphor compound so that the pigment is attached to a surface of the phosphor compound and the luminescence characteristics are improved efficiently.

According to one embodiment of this disclosure, because the green phosphor of the present invention has a short decay time, conferring excellent luminescence characteristics and high color purity, it may be preferentially used for a display device, such as plasma display panel (PDP).

Another embodiment of this disclosure provides a display device including the green phosphor as described herein. The display device includes a plasma display panel (PDP), a cathode ray tube (CRT), lamp, and/or the like.

FIG. 1 is a schematic view of an exemplary display device (e.g., a plasma display panel) according to one embodiment of the present invention.

As shown in FIG. 1, the plasma display panel includes a first substrate 1 (rear substrate) and a second substrate 11 (front substrate) that are disposed substantially in parallel with each other with a set or predetermined distance therebetween.

On the surface of the first substrate 1, a plurality of address electrodes 3 are disposed in one direction (the Y direction in the drawing), and a first dielectric layer 5 is disposed covering the address electrodes 3. A plurality of barrier ribs 7 are formed on the first dielectric layer 5 between the address electrodes 3 at a set or predetermined height to form a discharge space.

The barrier ribs 7 may be formed in any shape, as long as their shape may partition the discharge space. In addition, the barrier ribs 7 may have diverse patterns. For example, the barrier ribs 7 may be formed in an open type such as stripes or in a closed type such as a waffle, a matrix, or a delta shape. Also, the closed-type barrier ribs may be formed such that a horizontal cross-section of the discharge space is a polygon such as a quadrangle, a triangle, a pentagon, a circle or an oval.

Red (R), green (G), and blue (B) phosphor layers 9 are disposed respectively in red, green, and blue discharge cells formed between the barrier ribs 7. According to one embodiment, the green phosphor layer includes the green phosphor as described herein.

Display electrodes 13, each including a pair of transparent electrodes 13a and bus electrodes 13b, are disposed in a direction crossing the address electrodes 3 (an X direction in the drawing) on one surface of a second substrate 11 facing the first substrate 1. Also, a second dielectric layer 15 is disposed on the surface of the second substrate 11 while covering the display electrodes 13 and a protective layer 17 including magnesium oxide (MgO) on one side of the second dielectric layer 15.

Discharge cells are formed at crossing regions where the address electrodes 3 cross the display electrodes 13, and are filled with a discharge gas.

With the above-described structure, address discharge is performed by applying an address voltage (Va) to a space between the address electrodes 3 and any one display electrode (discharge sustain electrode) 13. When a sustain voltage (Vs) is applied a space between a pair of display electrodes (discharge sustain electrodes) 13, an exciting source generated from the sustain discharge excite a corresponding phosphor layer 9 to thereby emit visible light through the transparent second substrate 11. In this way, images are realized in a plasma display panel. A representative example of an exciting source is vacuum ultraviolet rays (VUV).

The following examples illustrate this disclosure in more detail. The following examples are not more than specific examples of this disclosure, and the scope of the present invention is not limited by the Examples.

EXAMPLES

Example 1

Preparation of Green Phosphor

After $Y_3Al_5O_{12}:Ce_{0.03}$ phosphor compound is dispersed in water, gelatin is added, and the gelatin adheres to the phosphor compound with adjustment of the pH. Subsequently, after a ball mill process is performed for about 24 hours, about 0.4 parts by weight of $Cr_2O_3$ pigment is obtained and added to 100 parts by weight of the phosphor compound along with a dispersing agent. It is then agitated, precipitated, and dried.

As a result, a green phosphor having a $Cr_2O_3$ pigment adhered to a surface of the $Y_3Al_5O_{12}:Ce_{0.03}$ phosphor compound is obtained.

Example 2

Preparation of Green Phosphor

A green phosphor is obtained according to the method of Example 1, except that a mixed pigment of $Cr_2O_3$ and $CoAl_2O_4$ (weight ratio=8:2) is used instead of $Cr_2O_3$ pigment.

Example 3

Preparation of Green Phosphor

A green phosphor is obtained according to the same method as Example 1, except that a mixed pigment of $Cr_2O_3$ and $CoAl_2O_4$ (weight ratio=5:5) is used instead of $Cr_2O_3$ pigment.

Example 4

Preparation of Green Phosphor

A green phosphor is obtained according to the same method as Example 1, except that a mixed pigment of $Cr_2O_3$ and $CoAl_2O_4$ (weight ratio=2:8) is used instead of $Cr_2O_3$ pigment.

Example 5

Preparation of Green Phosphor

A green phosphor is obtained according to the same method as Example 1, except that $CoAl_2O_4$ pigment is used instead of $Cr_2O_3$ pigment.

Example 6

Preparation of Green Phosphor

A green phosphor including $Cr_2O_3$ pigment adhering to a surface of $Y_3(Al_{0.5}Ga_{0.5})_5O_{12}:Ce_{0.03}$ phosphor compound is obtained according to the same method as Example 1, except that $Y_3(Al_{0.5}Ga_{0.5})_5O_{12}:Ce_{0.03}$ phosphor compound is used instead of $Y_3Al_5O_{12}:Ce_{0.03}$ phosphor compound.

Example 7

Preparation of Green Phosphor

A green phosphor is obtained according to the same method as Example 6, except that a mixed pigment of $Cr_2O_3$ and $CoAl_2O_4$ (weight ratio=8:2) is used instead of $Cr_2O_3$ pigment.

Example 8

Preparation of Green Phosphor

A green phosphor is obtained according to the same method as Example 6, except that a mixed pigment of $Cr_2O_3$ and $CoAl_2O_4$ (weight ratio=5:5) is used instead of $Cr_2O_3$ pigment.

Example 9

Preparation of Green Phosphor

A green phosphor is obtained according to the same method as Example 6, except that a mixed pigment of $Cr_2O_3$ and $CoAl_2O_4$ (weight ratio=2:8) is used instead of $Cr_2O_3$ pigment.

Example 10

Preparation of Green Phosphor

A green phosphor is obtained according to the same method as Example 6, except that $CoAl_2O_4$ pigment is used instead of $Cr_2O_3$ pigment.

Comparative Example 1

Preparation of Green Phosphor

Set or predetermined equivalents of $Y_2O_3$, $Al_2O_3$ and $CeO_2$ are mixed with a set or predetermined amount of flux to form the compound composition of $Y_3Al_5O_{12}:Ce_{0.03}$. Subsequently, the compound mixture is fired at about 1400° C. for two and a half hours to thereby produce a pulverulent body and acquire a green phosphor represented by $Y_3Al_5O_{12}:Ce_{0.03}$.

Comparative Example 2

Preparation of Green Phosphor

Set or predetermined equivalents of $Y_2O_3$, $Al_2O_3$, $Ga_2O_3$ and $CeO_2$ are mixed with a set or predetermined amount of flux to form the compound composition of $Y_3(Al_{0.5}Ga_{0.5})_5O_{12}:Ce_{0.03}$. Subsequently, the compound mixture is fired at about 1500° C. for about two and a half hours to thereby produce a pulverulent body and acquire a green phosphor represented by $Y_3(Al_{0.5}Ga_{0.5})_5O_{12}:Ce_{0.03}$.

Experimental Example 1

Evaluation of CIE Color Coordinates and Luminescence Characteristics

Figure 2:
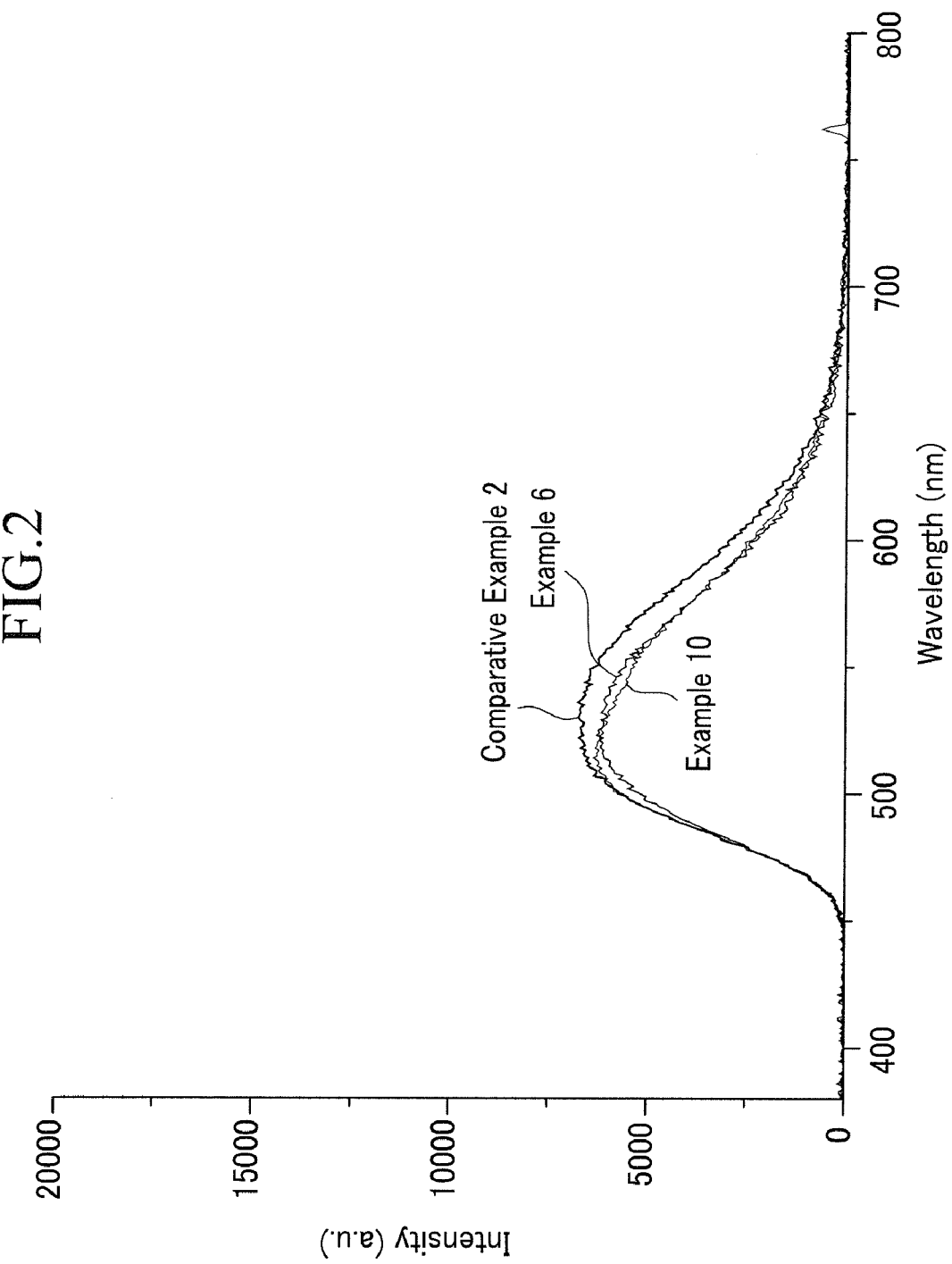
FIG. 2 shows light emitting spectra of phosphors prepared according to Examples 6 and 10 and Comparative Example 2.

CIE color coordinates, relative luminance and external light reflectance luminance of the green phosphors prepared according to Examples 1 to 10 and Comparative Examples 1 and 2 are measured. The measurement results are shown in the following Table 1. The relative luminance is a relative value obtained by calculating the luminance of a phosphor based on the relative luminance of the $Y_3Al_5O_{12}:Ce_{0.03}$ of Comparative Example 1 taken as 100%. The external light reflectance luminance, is also a relative value that is obtained by calculating the external light reflectance luminance of a phosphor based on the external light reflectance luminance of the $Y_3Al_5O_{12}:Ce_{0.03}$ of Comparative Example 1 taken as 100%. The light emitting spectra and reflectance spectra of the green phosphors prepared according to Examples 6 and 10 and Comparative Example 2 are shown in FIGS. 2 and 3.

TABLE 1

| | Phosphor compound | Pigment (based on 100 parts by weight of phosphor compound) | CIE x | CIE y | Relative luminance (%) | External light reflectance luminance (%) |
|---|---|---|---|---|---|---|
| Ex. 1 | $Y_3Al_5O_{12}:Ce_{0.03}$ | $Cr_2O_3$ (0.4 parts by weight) | 0.3993 | 0.5705 | 82 | 75 |
| Ex. 2 | $Y_3Al_5O_{12}:Ce_{0.03}$ | $Cr_2O_3$ and $CoAl_2O_4$ (weight ratio = 8:2) (0.4 parts by weight) | 0.3999 | 0.5699 | 83 | 75 |
| Ex. 3 | $Y_3Al_5O_{12}:Ce_{0.03}$ | $Cr_2O_3$ and $CoAl_2O_4$ (weight ratio = 5:5) (0.4 parts by weight) | 0.4002 | 0.5685 | 84 | 76 |
| Ex. 4 | $Y_3Al_5O_{12}:Ce_{0.03}$ | $Cr_2O_3$ and $CoAl_2O_4$ (weight ratio = 2:8) (0.4 parts by weight) | 0.4012 | 0.5671 | 84 | 78 |
| Ex. 5 | $Y_3Al_5O_{12}:Ce_{0.03}$ | $CoAl_2O_4$ (0.4 parts by weight) | 0.4019 | 0.5659 | 85 | 78 |
| Ex. 6 | $Y_3(Al_{0.5}Ga_{0.5})_5O_{12}:Ce_{0.03}$ | $Cr_2O_3$ (0.4 parts by weight) | 0.3105 | 0.5624 | 83 | 76 |
| Ex. 7 | $Y_3(Al_{0.5}Ga_{0.5})_5O_{12}:Ce_{0.03}$ | $Cr_2O_3$ and $CoAl_2O_4$ (weight ratio = 8:2) (0.4 parts by weight) | 0.3108 | 0.5621 | 84 | 76 |
| Ex. 8 | $Y_3(Al_{0.5}Ga_{0.5})_5O_{12}:Ce_{0.03}$ | $Cr_2O_3$ and $CoAl_2O_4$ (weight ratio = 5:5) (0.4 parts by weight) | 0.3111 | 0.5616 | 86 | 77 |
| Ex. 9 | $Y_3(Al_{0.5}Ga_{0.5})_5O_{12}:Ce_{0.03}$ | $Cr_2O_3$ and $CoAl_2O_4$ (weight ratio = 2:8) (0.4 parts by weight) | 0.3115 | 0.5611 | 86 | 79 |
| Ex. 10 | $Y_3(Al_{0.5}Ga_{0.5})_5O_{12}:Ce_{0.03}$ | $CoAl_2O_4$ (0.4 parts by weight) | 0.3117 | 0.5608 | 87 | 80 |
| Comp. Ex. 1 | $Y_3Al_5O_{12}:Ce_{0.03}$ | — | 0.4184 | 0.5568 | 100 | 100 |
| Comp. Ex. 2 | $Y_3(Al_{0.5}Ga_{0.5})_5O_{12}:Ce_{0.03}$ | — | 0.3268 | 0.5576 | 90 | 100 |

As shown in Table 1, the green phosphors prepared according to Examples 1 to 5 using $Y_3Al_5O_{12}:Ce_{0.03}$ as a phosphor compound and including a pigment have color coordinates of CIE X 0.3993-0.4019 and CIE Y 0.5659-0.5705, and as such, have higher color purity than the green phosphor prepared according to Comparative Example 1, which does not include a pigment. Additionally, the green phosphors prepared according to Examples 6 to 10 including $Y_3(Al_{0.5}Ga_{0.5})_5O_{12}:Ce_{0.03}$ as a phosphor compound and including a pigment have color coordinates of CIE X 0.3105-0.3117 and CIE Y 0.5608-0.5624, it is also confirmed that the green phosphors prepared according to Examples 6 to 10 have higher color purity than the green phosphor prepared according to Comparative Example 2, which does not include a pigment.

As shown in Table 1, the green phosphors of Examples 1 to 10 have a greater decrease rate of external light reflectance luminance than the decrease rate of relative luminance. Therefore, it is confirmed that the entire luminance efficiency is superior to the phosphors in the Comparative Examples 1 and 2. Luminance efficiency is proportionate to relative luminance/external light reflectance luminance values.

Referring to FIGS. 2 and 3, the green phosphor prepared according to Comparative Example 2 has superior relative luminance to the green phosphors prepared according to Examples 6 and 10. However, with respect to the external light reflectance luminance, the green phosphors prepared according to Examples 6 and 10 is superior to the green phosphor prepared according to Comparative Example 2.

With respect to luminance efficiency, the green phosphors of Examples 6 and 10 are superior to the green phosphor of Comparative Example 2.

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A green phosphor comprising a compound represented by Formula 1; and a pigment:

$$(Y_{3-x}M_x)(Al_{5-y}M'_y)O_{12}:Ce_z; \quad \text{Formula 1}$$

Wherein:
M is selected from the group consisting of Sc, Gd, In, Lu, and La;
M' is selected from the group consisting of Sc, Ga, Gd, In, Lu, and La
$0 \leq x < 3$;
$0 \leq y < 5$; and
$0 < z \leq 0.5$, wherein the pigment comprises $Cr_2O_2$ and $CoAl_2O_4$ in a weight ratio of from about 2:8 to about 8:2.

2. The green phosphor of claim 1, wherein the compound is represented by a formula selected from the group consisting of Formula 2, Formula 3, and combinations thereof:

$$Y_3Al_5O_{12}:Ce_z \quad \text{Formula 2}$$

$$Y_3(Al_{1-k}Ga_k)_5O_{12}:Ce_z \quad \text{Formula 3}$$

Wherein:
$0 \leq k < 1$; and
$0 < z \leq 0.5$.

3. The green phosphor of claim 1, wherein the pigment is on a surface of the compound.

4. The green phosphor of claim 3, wherein the pigment is coated on the surface of the compound.

5. The green phosphor of claim 1, wherein the pigment is provided in an amount of from about 0.01 parts by weight to about 20 parts by weight based on 100 parts by weight of the compound.

6. The green phosphor of claim 5, wherein the pigment is provided in an amount of from about 0.1 parts by weight to about 2 parts by weight based on 100 parts by weight of the compound.

7. The green phosphor of claim 1, wherein the pigment is in the form of particles, and the pigment particles have an average particle diameter of from about 5 nm to about 1.5 μm.

8. The green phosphor of claim 7, wherein the average particle diameter of the pigment particles is from about 10 nm to about 1 μm.

9. A display device comprising the green phosphor of claim 1.

10. The display device of claim 9, wherein the display device comprises at least one selected from the group consisting of a plasma display panel (PDP), a cathode ray tube, and a lamp.

* * * * *